(12) United States Patent
Boehme et al.

(10) Patent No.: US 10,417,237 B2
(45) Date of Patent: Sep. 17, 2019

(54) SORTING TABLES IN ANALYTICAL DATABASES

(71) Applicant: INTERNATIONAL BUSINESS MACHINES CORPORATION, Armonk, NY (US)

(72) Inventors: Thomas F. Boehme, Boeblingen (DE); Andreas Brodt, Gerlingen (DE); Daniel Martin, Stuttgart (DE); Oliver Schiller, Dettingen (DE)

(73) Assignee: International Business Machines Corporation, Armonk, NY (US)

( * ) Notice: Subject to any disclaimer, the term of this patent is extended or adjusted under 35 U.S.C. 154(b) by 763 days.

(21) Appl. No.: 15/163,139

(22) Filed: May 24, 2016

(65) Prior Publication Data

US 2017/0344608 A1 Nov. 30, 2017

(51) Int. Cl.
  *G06F 16/2457* (2019.01)
  *G06F 16/18* (2019.01)
  *G06F 16/242* (2019.01)
  *G06F 9/46* (2006.01)

(52) U.S. Cl.
  CPC .......... *G06F 16/2457* (2019.01); *G06F 9/466* (2013.01); *G06F 16/1865* (2019.01); *G06F 16/2433* (2019.01)

(58) Field of Classification Search
  USPC ........................................................ 707/722
  See application file for complete search history.

(56) References Cited

U.S. PATENT DOCUMENTS

| 7,921,106 | B2 * | 4/2011 | Chen ..................... G06F 16/951 707/723 |
| 8,229,902 | B2 * | 7/2012 | Vishniac ................. G06F 16/22 707/693 |
| 8,626,725 | B2 | 1/2014 | Netz et al. |
| 2009/0106210 | A1 | 4/2009 | Slezak et al. |
| 2011/0246432 | A1 | 10/2011 | Yang et al. |
| 2012/0254199 | A1 | 10/2012 | Kuno et al. |
| 2014/0095502 | A1 | 4/2014 | Ziauddin et al. |

(Continued)

OTHER PUBLICATIONS

IBM: List of IBM Patents Applications Treated as Related (Appendix P), Oct. 13, 2017, pp. 1-2.

(Continued)

*Primary Examiner* — Cam Linh T Nguyen
(74) *Attorney, Agent, or Firm* — Michael O'Keefe

(57) ABSTRACT

A method for sorting a data table is provided. The method may include providing a plurality of attribute value information for each data block of the data table. The method may also include receiving a query requiring a sorting on the first attribute of the data table. The method may further include determining a plurality of sequences of a plurality of data blocks having disjoint value ranges of the first attribute based on the provided plurality of attribute value information. The method may also include, for each determined sequence of the plurality of data blocks, reading a plurality of data, sorting the read plurality of data from each data block, and concatenating the sorted plurality of data from the plurality of data blocks within the determined sequence, thereby providing a sorted plurality of sequences. The method may further include merging the sorted plurality of sequences.

10 Claims, 3 Drawing Sheets

(56) References Cited

U.S. PATENT DOCUMENTS

| | | |
|---|---|---|
| 2014/0095520 A1 | 4/2014 | Ziauddin et al. |
| 2015/0199407 A1 | 7/2015 | Ziauddin et al. |
| 2015/0220529 A1* | 8/2015 | Eltabakh .............. G06F 16/182 707/719 |
| 2015/0286681 A1 | 10/2015 | Baer et al. |
| 2015/0286682 A1 | 10/2015 | Ziauddin |
| 2015/0347426 A1 | 12/2015 | Dickie et al. |
| 2015/0363447 A1 | 12/2015 | Dickie |

OTHER PUBLICATIONS

Boehme et al., U.S. Appl. No. 15/711,051, filed Sep. 21, 2017, titled "Sorting Tables in Analytical Databases", pp. 1-26.

Bayliss et al., "Zone Map and Attribute Clustering Examples," Oracle Data Warehousing and Very Large Databases, Last Modified on Jul. 31, 2014, p. 1-3, GitHub, Inc., https://github.com/oracle/dw-vldb/tree/master/att_clu_zone_map, Accessed on Apr. 29, 2016.

Bloom, "Space/Time Trade-offs in Hash Coding with Allowable Errors," Communications of the ACM, Jul. 1970, p. 422-426, vol. 13, Issue 7.

Boehme et al., "Executing Conditions With Negation Operators in Analytical Databases," Application and Drawings, filed Oct. 27, 2015, 48 Pages, U.S. Appl. No. 14/923,690.

Boehme et al., "Method for Storing a Dataset," Application and Drawings, filed Nov. 18, 2015, 43 Pages, U.S. Appl. No. 14/944,256.

Bonomi et al., "An Improved Construction for Counting Bloom Filters," Algorithms—ESA 2006, 2006, p. 684-695, LNCS 4168, Springer-Verlag Berlin Heidelberg.

Ensslen, "Redshift Zone Maps as an 'Indexing' Strategy," Optimal Business Intelligence Blog, Dec. 8, 2014, p. 1-4, OptimalBI Ltd., http://optimalbi.com/blog/2014/12/08/redshift-zone-maps-as-an-indexing-strategy/, Accessed on Apr. 29, 2016.

Gardi, "Efficient Algorithms for Disjoint Matchings among Intervals and Related Problems," Discrete Mathematics and Theoretical Computer Science, 2003, p. 168-180, LNCS 2731, Springer-Verlag Berlin Heidelberg.

Oracle, "Attribute Clusters and Zone Maps," Oracle Database 12c Tutorial, p. 1-27, http://www.oracle.com/webfolder/technetwork/tutorials/obe/db/12c/r1/12c_aczm/12c_aczm.html, Accessed on May 4, 2016.

Oracle, "Partition Pruning with Zone Maps," Oracle Database VLDB and Partitioning Guide, p. 1-2, Oracle Database Online Documentation 12c Release 1 (12.1), Chapter 3, https://docs.oracle.com/database/121/VLDBG/GUID-65DA5654-970B-4056-BFBF-C300C9A8AA2A.htm#VLDBG14101, Accessed on May 2, 2016.

Oracle, "Using Zone Maps," Oracle Database Data Warehousing Guide, p. 1-24, Oracle Database Online Documentation 12c Release 1 (12.1), Chapter 13, http://docs.oracle.com/database/121/DWHSG/zone_maps.htm#DWHSG9355, Accessed on Apr. 29, 2016.

Ślęzak "Brighthouse: An Analytic Data Warehouse for Ad-hoc Queries," PVLDB '08, Aug. 23-28, 2008, p. 1337-1345, VLDB Endowment, ACM, Auckland, New Zealand.

* cited by examiner

SORTING TABLES IN ANALYTICAL DATABASES

BACKGROUND

The present invention relates to the field of digital computer systems, and more specifically, to a method for storing a data table.

Analytical database systems manage very large amounts of data and are optimized for queries that must read large portions of it. At the same time, they offer the complete querying power of Structured Query Language (SQL). As such systems do not focus on on-line transaction processing (OLTP) load (i.e. involving point queries), the systems typically do not index each data row but heavily rely on scan performance. Processing such large data tables is expensive in term of processing resources. Therefore, a continuous need exists to improve access performances to large data tables.

SUMMARY

According to one embodiment, a method for sorting a data table is provided. The method may include providing a plurality of attribute value information for each data block of the data table, whereby the provided plurality of attribute value information reflects an upper bound and a lower bound of a plurality of extreme values of a first attribute of the data table. The method may also include receiving a query requiring a sorting on the first attribute of the data table. The method may further include determining a plurality of sequences of a plurality of data blocks having disjoint value ranges of the first attribute based on the provided plurality of attribute value information. The method may also include, for each determined sequence of the plurality of data blocks, reading a plurality of data, sorting the read plurality of data from each data block, and concatenating the sorted plurality of data from the plurality of data blocks within the determined sequence, thereby providing a sorted plurality of sequences. The method may further include merging the sorted plurality of sequences.

According to another embodiment, a computer system for sorting a data table is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include The method may include providing a plurality of attribute value information for each data block of the data table, whereby the provided plurality of attribute value information reflects an upper bound and a lower bound of a plurality of extreme values of a first attribute of the data table. The method may also include receiving a query requiring a sorting on the first attribute of the data table. The method may further include determining a plurality of sequences of a plurality of data blocks having disjoint value ranges of the first attribute based on the provided plurality of attribute value information. The method may also include, for each determined sequence of the plurality of data blocks, reading a plurality of data, sorting the read plurality of data from each data block, and concatenating the sorted plurality of data from the plurality of data blocks within the determined sequence, thereby providing a sorted plurality of sequences. The method may further include merging the sorted plurality of sequences.

According to yet another embodiment, a computer program product for sorting a data table is provided. The computer program product may include one or more computer-readable storage devices and program instructions stored on at least one of the one or more tangible storage devices, the program instructions executable by a processor. The computer program product may include program instructions to provide a plurality of attribute value information for each data block of the data table, whereby the provided plurality of attribute value information reflects an upper bound and a lower bound of a plurality of extreme values of a first attribute of the data table. The computer program product may also include program instructions to receive a query requiring a sorting on the first attribute of the data table. The computer program product may further include program instructions to determine a plurality of sequences of a plurality of data blocks having disjoint value ranges of the first attribute based on the provided plurality of attribute value information. The computer program product may also include program instructions to, for each determined sequence of the plurality of data blocks, read a plurality of data, sort the read plurality of data from each data block, and concatenate the sorted plurality of data from the plurality of data blocks within the determined sequence, thereby providing a sorted plurality of sequences. The computer program product may further include program instructions to merge the sorted plurality of sequences.

BRIEF DESCRIPTION OF THE SEVERAL VIEWS OF THE DRAWINGS

In the following embodiments of the invention are explained in greater detail, by way of example only, making reference to the drawings in which.

DETAILED DESCRIPTION

Figure 1:
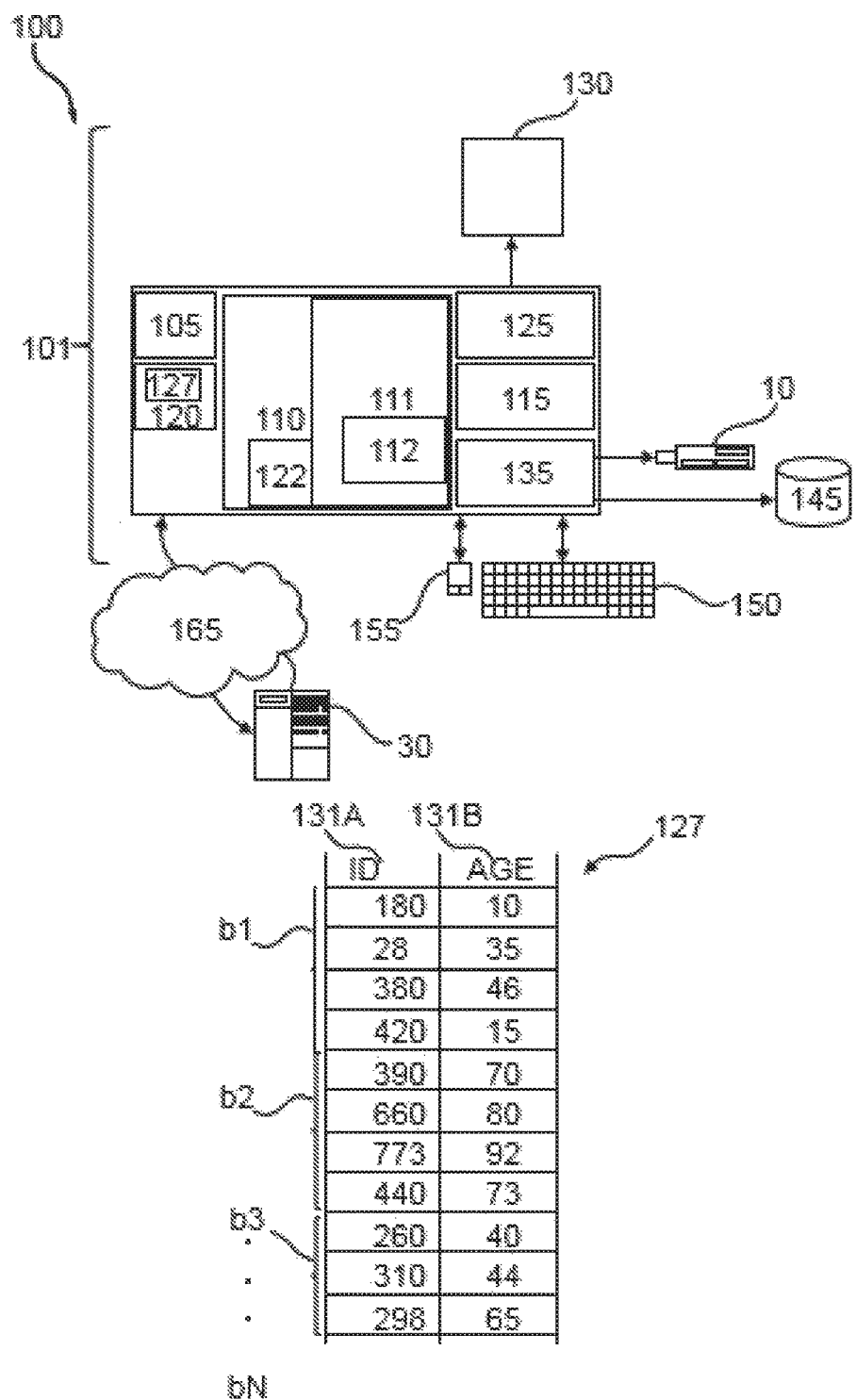
FIG. 1 represents a computerized system, suited for implementing one or more method steps as involved in the present disclosure.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Using the attribute value information about every data block may accelerate sorting of the data table. Instead of scanning the blocks in the physical order in which they happen to be stored, data blocks read in runs or sequences of data blocks with disjointed value ranges. If not currently sorted, to create a sorted result, only the rows within each data block may be sorted. After that, the rows of the entire sequence can be concatenated without the need for a merge step. Finally, the sorted sequences may be merged into a single sorted result.

The present method may have the advantage of speeding up the sorting process of data tables. Furthermore, the present method may avoid significant amounts of memory copies and CPU operations since the knowledge of the attribute value information may be exploited on expensive order-related operations, such as sorting.

The attribute value information may be descriptive of the first attribute. Using the attribute value information, a preselection of data blocks of the data table may be performed before scanning the preselected data blocks. The attribute value information may include information or metadata on the first attribute that allows such a preselection. In one example, the attribute value information may include at least one of a minimum attribute value of the first attribute in a data block and a maximum attribute value of the first attribute of the data block.

For example, the maximum and the minimum attribute values define a first range of values of the first attribute in a respective data block. For example, a received data query may require a second range of values of the first attribute. The processing of the data query may comprise selecting data blocks of the data table whose respective first range overlaps with the second range and processing those selected data blocks, which may form a scan list.

The term "data block," as used herein, may refer to a logical or physical storage unit for storing the data of the data table. The data block may be the smallest storage unit that is handled by a database management system or an operating system of the computer system.

According to one embodiment, determining the sequences includes determining the value range of the first attribute of the data table; splitting the determined value range into two or more partitions each including a respective set of data blocks, and each partition having a respective value range of the first attribute that is not overlapping with the value range of the first attribute in at least one other partition; and processing each of the partitions for determining the sequences. This embodiment may be advantageous as it may make use of partitioning algorithms to provide the sequences. Furthermore, this may enable a time efficient determination of the sequences using the partitions.

According to one embodiment, the method further includes splitting the determined value range based on the number of threads available in the computer system, whereby each partition includes at least one sequence of data blocks. For example, it may be determined that the steps of processing each determined sequence (e.g. reading and sorting data blocks and concatenating sorted data) and merging the sorted sequences may be performed as a process having a predefined number of threads. The splitting may be performed such that each partition may be processed by a respective thread of the predefined number of threads. This may enable an efficient usage of available processing resources.

According to one embodiment, the method further includes inserting the sequences of each partition in a respective scan list and inputting each scan list to a respective thread for performing the sorting and the merging by the threads. This may speed up the sorting process.

According to one embodiment, the value range of the first attribute in each partition does not overlap with any other value range of another partition. The method further includes performing the sorting and the merging in parallel using the threads. This may further speed up the sorting process.

According to one embodiment, the method further includes inputting each partition to a single thread of the threads for determining the sequences in the each partition. A thread may be used to process a respective partition. The processing of the partition may include the step of determining the sequences and/or the steps of processing the determined sequences of that partition in order to read, sort data, concatenate, and/or merge that sequences once sorted.

According to one embodiment, each sequence of the determined sequences includes a number of data blocks that is smaller than a predetermined maximum number. This may provide a controlled method for processing the sequences e.g. based on available processing resources.

According to one embodiment, the merging of the sorted sequences includes merging the sorted sequences in each partition and combining the merged sequences of the partitions. This may speed up the process of merging by splitting the merging on the partitions and by, for example, processing in parallel the partitions.

According to one embodiment, the method further includes combining the set of data blocks of each partition into a smaller number of data blocks in case the size of each data block of at least part of the set of data block is smaller than a predetermined threshold. For example, the set of data blocks may be combined in a single data block. This may speed up the process of the present method as it may handle fewer number of data blocks.

According to one embodiment, wherein the data blocks are physically stored on a disk storage in a predefined order different from the order of data blocks in a given determined sequence. The method further includes providing a buffer, copying data blocks of the given sequence from the disk storage into the buffer, and performing the reading and sorting in the order of data blocks in the given sequence. This may save processing resources as it may prevent random access to disk storages, which is a very consuming process.

FIG. 1 represents a general computerized system, suited for implementing method steps as involved in the disclosure.

It will be appreciated that the methods described herein are at least partly non-interactive, and automated by way of computerized systems, such as servers or embedded systems. In exemplary embodiments though, the methods described herein can be implemented in a (partly) interactive system. These methods can further be implemented in software 112, 122 (including firmware 122), hardware (processor) 105, or a combination thereof. In exemplary embodiments, the methods described herein are implemented in software, as an executable program, and is executed by a special or general-purpose digital computer, such as a personal computer, workstation, minicomputer, or mainframe computer. The most general system 100 therefore includes a general-purpose computer 101.

In exemplary embodiments, in terms of hardware architecture, as shown in FIG. 1, the computer 101 includes a processor 105, memory (main memory)110 coupled to a memory controller 115, and one or more input and/or output (I/O) devices (or peripherals) 10, 145 that are communicatively coupled via a local input/output controller 135. The I/O controller 135 can be, but is not limited to, one or more buses or other wired or wireless connections, as is known in the art. The I/O controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components. As described herein the I/O devices 10, 145 may generally include any generalized cryptographic card or smart card known in the art.

The processor 105 is a hardware device for executing software, particularly that stored in memory 110. The processor 105 can be any custom made or commercially available processor, a central processing unit (CPU), an auxiliary processor among several processors associated with the computer 101, a semiconductor based microprocessor (in the form of a microchip or chip set), a macroprocessor, or generally any device for executing software instructions.

The memory 110 can include any one or combination of volatile memory elements (e.g., random access memory (RAM, such as DRAM, SRAM, SDRAM, etc.)) and non-volatile memory elements (e.g., ROM, erasable programmable read only memory (EPROM), electronically erasable programmable read only memory (EEPROM), programmable read only memory (PROM). Note that the memory 110 can have a distributed architecture, where various components are remotely situated from one another, but can be accessed by the processor 105.

The software in memory 110 may include one or more separate programs, each of which comprises an ordered listing of executable instructions for implementing logical functions, notably functions involved in embodiments of this invention. In the example of FIG. 1, software in the memory 110 includes instructions 112 e.g. instructions to manage databases such as a database management system. The memory 110 may further include a query optimizer. The query optimizer may include instructions e.g. software instructions that when executed may provide a query execution plan for executing a given query.

The software in memory 110 shall also typically include a suitable operating system (OS) 111. The OS 111 essentially controls the execution of other computer programs, such as possibly software 112 for implementing methods as described herein.

The methods described herein may be in the form of a source program 112, executable program 112 (object code), script, or any other entity comprising a set of instructions 112 to be performed. When a source program, then the program needs to be translated via a compiler, assembler, interpreter, or the like, which may or may not be included within the memory 110, so as to operate properly in connection with the OS 111. Furthermore, the methods can be written as an object oriented programming language, which has classes of data and methods, or a procedure programming language, which has routines, subroutines, and/or functions.

In exemplary embodiments, a conventional keyboard 150 and mouse 155 can be coupled to the I/O controller 135. Other output devices such as the I/O devices 145 may include input devices, for example but not limited to a printer, a scanner, microphone, and the like. Finally, the I/O devices 10, 145 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The I/O devices 10, 145 can be any generalized cryptographic card or smart card known in the art. The system 100 can further include a display controller 125 coupled to a display 130. In exemplary embodiments, the system 100 can further include a network interface for coupling to a network 165. The network 165 can be an IP-based network for communication between the computer 101 and any external server, client and the like via a broadband connection. The network 165 transmits and receives data between the computer 101 and external systems 30, which can be involved to perform part or all of the steps of the methods discussed herein. In exemplary embodiments, network 165 can be a managed IP network administered by a service provider. The network 165 may be implemented in a wireless fashion, e.g., using wireless protocols and technologies, such as WiFi, WiMax, etc. The network 165 can also be a packet-switched network such as a local area network, wide area network, metropolitan area network, Internet network, or other similar type of network environment. The network 165 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 101 is a PC, workstation, intelligent device, etc., the software in the memory 110 may further include a basic input output system (BIOS) 122. The BIOS is a set of essential software routines that initialize and test hardware at startup, start the OS 111, and support the transfer of data among the hardware devices. The BIOS is stored in ROM so that the BIOS can be executed when the computer 101 is activated.

When the computer 101 is in operation, the processor 105 is configured to execute software 112 stored within the memory 110, to communicate data to and from the memory 110, and to generally control operations of the computer 101 pursuant to the software. The methods described herein and the OS 111, in whole or in part, but typically the latter, are read by the processor 105, possibly buffered within the processor 105, and then executed.

When the systems and methods described herein are implemented in software 112, as is shown in FIG. 1, the methods can be stored on any computer readable medium, such as storage 120, for use by or in connection with any computer related system or method. The storage 120 may comprise a disk storage such as HDD storage.

The storage 120 may include at least one data table (or data set) 127. For example, the software 112 may receive (automatically or upon request) as input the data table 127, or may download the data table 127 from storage 120 or memory 110.

The data table 127 may include one or more columns 131A-B, wherein each column is represented by a respective attribute (e.g. "ID" 131A and "Age" 131B). The rows of the data table 127 may include values of the attributes. The data table 127 may, for example, include or may be stored on multiple (e.g. contiguous) data blocks b1-bN.

For example, as illustrated in FIG. 1, the data table 127 may be divided or split or assigned or stored on data blocks b1-bN using the number of rows in the data table 127.

In another example, the data table 127 may be split or divided based on storage size such that each data block b1-bN contains or is assigned to one or more storage units e.g. data pages. The term "storage unit" as used herein is intended to refer to the minimum addressable unit (e.g. by software 112) in order to store the data table 127. The size of a storage unit may be an integer multiple of the size of a disk unit. The size of the storage unit may be user defined. For example, each storage unit (e.g. data page) may correspond to a specific number of bytes of physical database space on disk (e.g., 4 KB). Other storage units having different granularities may be addressable or used in order to store data e.g. in the storage 120. For example, other storage levels may include containers and extents, wherein extents can be defined in term of number of data pages, while a container can be determined in term of number of extents.

The rows of each data block e.g. b1 of the data table 127 may be stored on contiguous, linked, or indexed disk units (e.g. of storage 120) that form the corresponding data pages of the data block b1. The term disk unit refers to the minimum addressable unit on storage 120. For example, a disk unit may have a size of 512 bytes. The data blocks b1-bN may or may not comprise the same number of data pages.

In one example, data blocks b1-bN of the data table may be contiguously stored on storage 120. Rows of data block b1 are stored followed by rows of data block b2 and so on. And, the rows of each data block may be stored on contiguous disk units of storage 120.

The term "data table" or data set as used herein refers to a collection of data that may be presented in tabular form. Each column in the data table may represent a particular variable or attribute. Each row in the data table may represent a given member, record, or entry of the data table.

While FIG. 1 only shows a few attributes and data blocks, it will be appreciated that numerous attributes and/or data blocks may exist or may be used.

Figure 2:
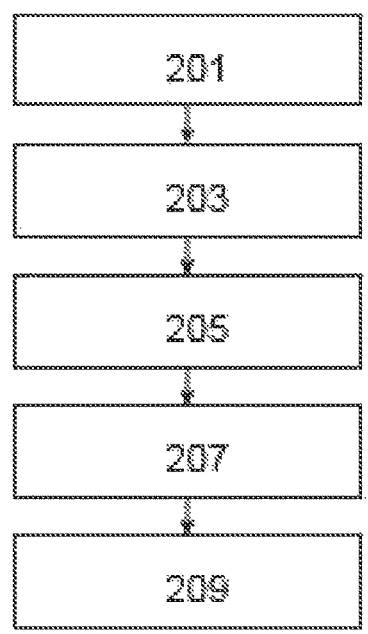
FIG. 2 is a flowchart of a method for sorting a data table.
Figure 2:
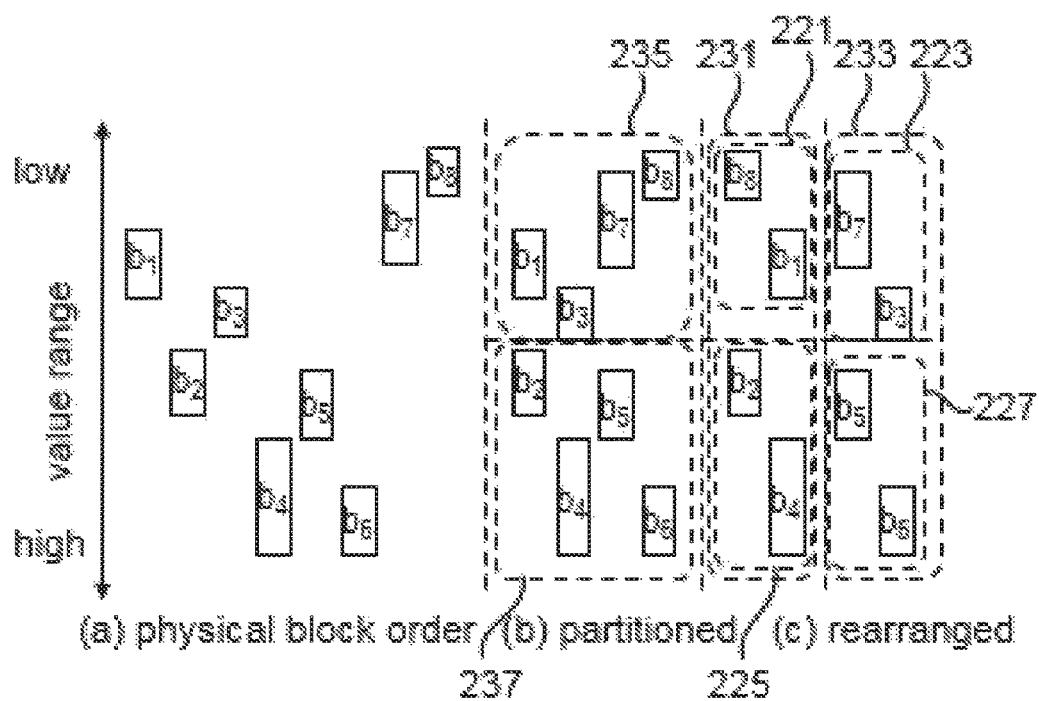

FIG. 2 is a flowchart of a method for sorting a data table e.g. 127. Each data block b1-bN of the data table 127, is associated with attribute value information. In one example, the attribute value information indicates the current value or up to date value range of the first attribute in a given data block. In another example, the attribute value information of each data block may indicate upper and lower bounds of extreme values of a first attribute of the data table which may or may not be the current extreme values. In other words, the minimum and maximum values of the first attribute in the attribute value information are guaranteed lower and upper bounds; usually they are extreme values when they are determined but later chances in the data may cause them to be guaranteed lower/upper bounds (if the attribute value information is not regularly updated). For example, the attribute value information of data block b1 may indicate for the first attribute being attribute 131B the range [10, 46] which is the current value range. In another example, the attribute value information of data block b1 may indicate for the first attribute the range [5-50] which was the range at the time the attribute value information is determined, this range of values provides however the upper and lower bounds for the current minimum and maximum values of the first attribute. This is because after the time of determining the attribute value information values of the first attribute may be deleted ore replaced such that an initial range of values of the first attribute may not be up to date. However, that initial value range still provides a guaranteed upper and lower bounds for the current maximum and minimum values of the first attribute as new inserted data have values of the first attribute that do not exceed the initial determined range of values.

In step 201, a query requiring sorting on the first attribute of the data table may be received. In other words, the processing of the received query may include or require sorting of data table 127 on the first attribute. For example, the received query may include a condition on the first attribute that requires sorting on the first attribute. In another example, the received query may not include any condition on the first attribute but the computer system may derive from the query the need of sorting the data table on the first attribute i.e. the received query implies the sorting of the data table on the first attribute.

In response to receiving the query, sequences of data blocks of the data table 127 having disjoint value ranges of the first attribute may be determined in step 203. The determination may be based on the attribute value information. As illustrated in FIG. 2, each of data blocks b1-b8 has an associated value range of the first attribute. For example, data blocks b1, b3 and b7 have overlapping value ranges of the first attribute and thus may not be part of a same sequence. For example, each sequence of data blocks may comprise an ordered sequence of data blocks whereby the order is determined based on the value range of the first attribute in each data block e.g. in the sequence 221 the data block b8 is first ordered and the data block b1 is second ordered. The reading or accessing of the data blocks of each sequence may be performed in that order e.g. first reading b8 and then b1.

Each sequence may include a number of data blocks that is smaller than a predefined maximum number.

In another example, the sequences include sequences whose value ranges of the first attribute 131B overlap at the smallest value range. As shown in FIG. 2 the pair of sequences 221 and 223 (and the other pair of sequences 225 and 227) have an overlapping range that is smaller than the pair of sequences 231 and 233. In this case, the determining step would determine the four sequences 221-227. The data blocks in each sequence 221-233 have disjoint values range of the first attribute. For example, data block b8 has a value range that is smaller than the value range of data block b1 and their value ranges do not overlap.

In one example, the determining of the sequences of the data blocks may be performed as follows. The data blocks b1-b8 may be grouped in disjoint partitions 235 and 237, such that each partition exclusively covers a certain value range. Moreover, the data blocks in the partitions 235 and 237 may be rearranged into sequences or runs of data blocks 221-227 with disjoint value ranges of the first attribute. FIG. 2 illustrates partitioning and rearranging data blocks inside the partitions to combine the two approaches. In the example of FIG. 2, partition 235 comprises data blocks b1, b3, b7 and b8. The sequences of data blocks determined from this partition are sequence 221 and 223.

For each sequence of data blocks of the sequences, data of each data block of the each sequence is read and the read data is sorted in step 205. And the sorted data is concatenated within the each sequence in step 207. This may result in sorted sequences.

In step 209, the sorted sequences may be merged.

For example, for performing steps 205-209, the partitions may be used such that each partition may be processed by one thread. This may allow the CPU-intensive work to be executed in parallel on different CPUs. Merging the sequences or partitions into a final result, which cannot be fully parallelized, may include appending all sorted partitions.

For example, in case that completely disjoint partitions do not exist for all desired sort orders, it can be attempted to create as many disjoint partitions as possible and create overlapping (in value range of the first attribute) partitions for the remaining data blocks. This may render the merging cheaper because the non-overlapping partitions can still be appended. A similar challenge may emerge if there are less disjoint partitions than available sort threads or if some partitions are significantly smaller than others. In these cases the partitions may be subdivided so that the load may be well balanced across the threads. For example, the partitions may be divided at delimiters between sequences (as defined below), such that they can be processed more efficiently. The resulting sorted sequences may overlap and may require merging, but the merges may only be partial and thus cheaper than without the present method.

In order to process the sequences using the partitions described above, the sequences of each partition may be inserted in a respective scan list that the scan must process in order to evaluate the query. The order in which the data blocks occur in the scan lists has been optimized to speed up sorting. For example the sequences in each scan list may be separated by a delimiter that marks the end of each sequence. Between two delimiters, a scan may concatenate the rows of all data blocks, after they have been sorted inside their local data block.

Each of the resulting scan lists may be processed using a respective thread. In the example of FIG. 2, the two threads would receive the following scan lists (EOR denotes the delimiter).

a. thread 1 {b8, b1, EOR, b7, b3, EOR}
b. thread 2 {b2, b4, EOR, b5, b6, EOR}

Figure 3:
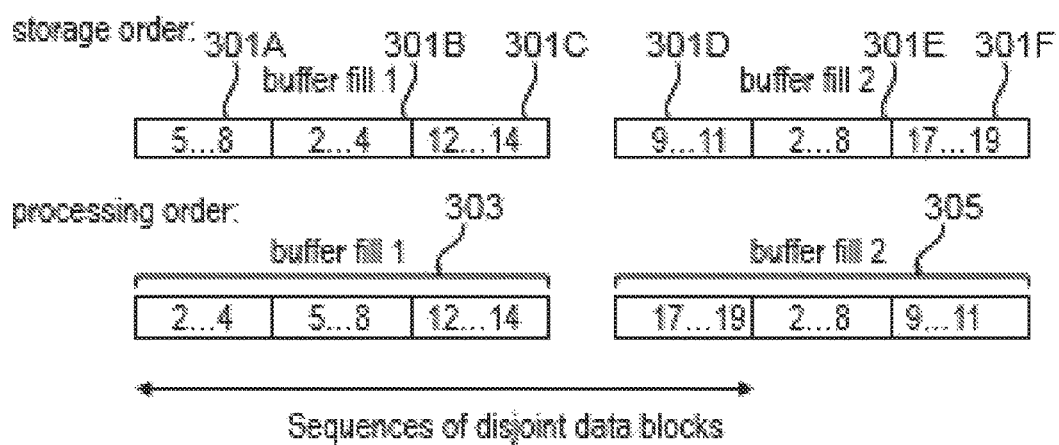
FIG. 3 illustrates a method for processing data blocks using a buffer.

FIG. 3 illustrates an example method for processing data blocks b1-b8 of the data table 127 using a buffer. FIG. 3 illustrates the storage order of data blocks 301A-F on the physical disk storage e.g. 120. For example, data block 301A has a respective range of attribute values which is five to eight and it is first ordered in the physical storage order. That is, reading from the disk storage 120 may be optimal when sequentially reading data blocks 301A-F in their storage order (i.e. starting from data block 301A and ending with data block 301F). However, in the present method the data blocks may be processed in another order that is determined by the sequences (e.g. of step 203). Reading the data blocks in the order of sequences may lead to a random access to the disk storage. For example, FIG. 3 shows two determined sequences 303 and 305, where data block 301B has the first order in the sequence 303 while data block 301A has the second order in sequence 303. In this case, processing the sequence 303 directly from the disk storage may lead to reading first data block 301B and then 301A from the disk storage which is a random access because data block 301A is ordered first and the data block 301B is ordered second in the disk storage. This may slow down the whole process of the present method. To prevent this, a buffer may be used which can be part of the memory 110.

The buffer may be of a limited size that is smaller than a predetermined maximum size. Using the buffer, this method may enable sequential reads. For that, the reordering may only occur across the data blocks in a single buffer fill in storage order. Data blocks are read sequentially into the buffer. They are processed in the order derived from attribute value information. Then, the buffer is filled again and so forth. For example, the buffer is first filed with data blocks of sequence 303 and then the data blocks may be randomly accessed in the buffer in order to read them in the order defined by the sequence 303. Randomly accessing a buffer is much easier than randomly accessing the disk storage. Once the sequence is processed then the following sequence 305 is copied in the buffer and so on. For simplicity of the description the sequences are shown as entirely fitting in the buffer, however, a sequence may fit into one or more buffer fills. If for example a sequence fits in more than one buffer fill, the first ordered data blocks are first copied in the buffer and processed (e.g. reading data and sorting the read data) and the subsequent ordered data blocks are subsequently copied and processed until the sequence is completed.

Using this buffered approach, disjoint sequences can nevertheless be longer than the buffer size, if at least some data blocks in the subsequent buffer fill are entirely larger than the largest block of the current buffer fill.

In another example, a computer-implemented method for providing sorted query results in a database management system is provided. The method includes receiving a query against a data table, the data table being stored on multiple data blocks (a data block may for example be a physical storage unit or a fixed number of records); determining that processing of the query involves sorting query results with respect to a first attribute; in response to determining that the processing of the query involves sorting query results, accessing attribute value information on the data blocks, the attribute value information reflecting upper/lower bounds of extreme values for at least one attribute of the data table; if the attribute value information reflects upper/lower bounds of extreme values of the first attribute, determining sequences of data blocks having disjoint value ranges of the first attribute based on the attribute value information; reading data from the data blocks to memory as defined by the sequences; sorting data read from each data block; concatenating sorted data from data blocks within a sequence; and merging concatenated sorted data from the sequences.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for sorting a data table, the method comprising:
    providing a plurality of attribute value information for each data block of the data table, wherein the provided plurality of attribute value information reflects an upper bound and a lower bound of a plurality of extreme values of a first attribute of the data table;
    receiving a query requiring a sorting on the first attribute of the data table;
    determining a plurality of sequences of a plurality of data blocks having disjoint value ranges of the first attribute based on the provided plurality of attribute value information;
        for each determined sequence of the plurality of data blocks, reading a plurality of data, sorting the read plurality of data from each data block, and concatenating the sorted plurality of data from the plurality of data blocks within the determined sequence, thereby providing a sorted plurality of sequences; and
    merging the sorted plurality of sequences.

2. The method of claim 1, determining the plurality of sequences further comprises:
    determining a value range of the first attribute of the data table;
    splitting the determined value range into two or more partitions each comprising a respective plurality of data blocks, and wherein each partition of the two or more partitions has a respective value range of the first attribute that is not overlapping with the determined value range of the first attribute in at least one other partition; and
    processing each of the two or more partitions for determining the plurality of sequences.

3. The method of claim 2, further comprising:
    splitting the determined value range based on a plurality of available threads on a computer system that is configured to perform the method.

4. The method of claim 3, wherein each partition comprises at least one sequence of data blocks, and wherein the method further comprises:
inserting the determined plurality of sequences of each partition in a respective scan list; and
inputting each respective scan list to a single thread of the plurality of available threads for sorting the read plurality of data and merging the sorted plurality of sequences by the plurality of available threads.

5. The method of claim 3, wherein each partition comprises at least one sequence of data blocks, and wherein the determined value range of the first attribute in each partition does not overlap with any other value range of another partition, and the method further comprises:
sorting the read plurality of data and merging the sorted plurality of sequences in parallel for each partition using the plurality of available threads.

6. The method of claim 2, wherein merging the sorted plurality of sequences further comprises:
merging the sorted plurality of sequences in each partition; and
combining the merged plurality of sequences of the partitions.

7. The method of claim 2, further comprising:
combining the plurality of data blocks of each partition into a smaller plurality of data blocks in case each data block size of at least part of the plurality of data blocks is smaller than a predetermined threshold.

8. The method of claim 3, further comprising:
inputting each partition to a single thread of the plurality of available threads for determining the plurality of sequences in the each partition.

9. The method of claim 1, wherein the plurality of data blocks are physically stored on a disk storage in a predefined order different from an order of the plurality of data blocks in a given determined sequence, and the method further comprising:
providing a buffer;
copying the plurality of data blocks of the given sequence from the disk storage into the buffer; and
reading a plurality of data and sorting the read plurality of data from each data block in the order of the plurality of data blocks in the given determined sequence.

10. The method of claim 1, wherein each sequence of the determined plurality of sequences comprises a smaller plurality of data blocks than a predetermined maximum number.

* * * * *